US011440350B2

(12) United States Patent
Jacoby et al.

(10) Patent No.: US 11,440,350 B2
(45) Date of Patent: Sep. 13, 2022

(54) PNEUMATIC TIRE

(71) Applicant: The Goodyear Tire & Rubber Company, Akron, OH (US)

(72) Inventors: Claude Charles Jacoby, Wasserbillig (LU); Frida Nzulu, Rollingen (LU); Nihat Ali Isitman, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 204 days.

(21) Appl. No.: 15/930,765

(22) Filed: May 13, 2020

(65) Prior Publication Data

US 2021/0354512 A1 Nov. 18, 2021

(51) Int. Cl.
| | |
|---|---|
| *B60C 1/00* | (2006.01) |
| *C08L 9/06* | (2006.01) |
| *C08L 15/00* | (2006.01) |
| *C08K 3/26* | (2006.01) |
| *C08K 3/36* | (2006.01) |
| *C08L 7/00* | (2006.01) |
| *C08L 47/00* | (2006.01) |
| *C08L 91/00* | (2006.01) |

(52) U.S. Cl.
CPC .............. *B60C 1/0016* (2013.01); *C08K 3/36* (2013.01); *C08L 9/06* (2013.01); *C08L 15/00* (2013.01); *C08L 7/00* (2013.01); *C08L 47/00* (2013.01); *C08L 91/005* (2013.01)

(58) Field of Classification Search
CPC ... B60C 1/00; C08L 9/06; C08L 15/00; C08K 3/36
USPC ...................................................... 523/156
See application file for complete search history.

(56) References Cited

U.S. PATENT DOCUMENTS

| | | | |
|---|---|---|---|
| 4,427,832 A | 1/1984 | Yagi et al. |
| 4,487,892 A | 12/1984 | Ohmori et al. |
| 4,515,922 A | 5/1985 | Sakakibara et al. |
| 4,567,928 A | 2/1986 | Takiguchi |
| 4,616,685 A | 10/1986 | Harakon et al. |
| 4,704,414 A | 11/1987 | Kerner et al. |
| 4,843,120 A | 6/1989 | Halasa et al. |
| 5,047,483 A | 9/1991 | Halasa et al. |
| 5,061,765 A | 10/1991 | Hsu |
| 5,137,998 A | 8/1992 | Hsu et al. |
| 5,239,009 A | 8/1993 | Halasa et al. |
| 5,272,220 A | 12/1993 | Rodgers et al. |
| 5,395,891 A | 3/1995 | Obrecht et al. |
| 5,405,927 A | 4/1995 | Hsu et al. |
| 5,504,135 A | 4/1996 | Ardrizzi et al. |
| 5,620,939 A | 4/1997 | Halasa et al. |
| 5,627,237 A | 5/1997 | Halasa et al. |
| 5,654,384 A | 8/1997 | Halasa et al. |
| 5,672,639 A | 9/1997 | Corvasce et al. |
| 5,677,402 A | 10/1997 | Halasa et al. |
| 5,696,197 A | 12/1997 | Smith et al. |
| 5,703,151 A | 12/1997 | Yamamoto et al. |
| 5,717,022 A | 2/1998 | Beckmann et al. |
| 5,723,530 A | 3/1998 | Zanzig et al. |
| 5,773,504 A | 6/1998 | Smith et al. |
| 5,877,249 A | 3/1999 | Lambotte |
| 5,901,766 A | 5/1999 | Sandstrom et al. |
| 5,967,211 A | 10/1999 | Lucas et al. |
| 6,103,808 A | 8/2000 | Hashimoto |
| 6,103,842 A | 8/2000 | Halasa et al. |
| 6,121,367 A | 9/2000 | Corvasce et al. |
| 6,123,762 A | 9/2000 | Barthel et al. |
| 6,127,488 A | 10/2000 | Obrecht et al. |
| 6,133,364 A | 10/2000 | Obrecht et al. |
| 6,146,520 A | 11/2000 | Gupte et al. |
| 6,186,204 B1 | 2/2001 | Sasaka et al. |
| 6,207,757 B1 | 3/2001 | Obrecht et al. |
| 6,214,919 B1 | 4/2001 | Schlademan et al. |
| 6,242,534 B1 | 6/2001 | Obrecht et al. |
| 6,248,929 B1 | 6/2001 | Kaimai et al. |
| 6,355,719 B1 | 3/2002 | Corvasce et al. |
| 6,372,857 B1 | 4/2002 | Obrecht et al. |

(Continued)

FOREIGN PATENT DOCUMENTS

DE 102011055966 A1 6/2013
DE 102015210422 A1 12/2016

(Continued)

OTHER PUBLICATIONS

European Search Report for Serial No. EP21172744 dated Oct. 25, 2021.
Cray Valley USA, LLC, Product Bulletin, Wingtak Resins, pp. 1-11, Exton, PA, USA.
Goodyear Chemical, Budene 1223, Product Data Sheet, Aug. 23, 2013, Goodyear International Corporation, Akron, OH, USA.

(Continued)

*Primary Examiner* — Deve V Hall
(74) *Attorney, Agent, or Firm* — Mandy B. Willis

(57) ABSTRACT

The present invention is directed to a pneumatic tire having a tread comprising a vulcanizable rubber composition comprising, based on 100 parts by weight of elastomer (phr), (A) from about 45 to about 100 phr of a low-cis polybutadiene having a vinyl-1,2 content ranging from 5 to 30 percent and a Tg ranging from −95° C. to −70° C.;

(B) from about 0 to about 40 phr of a solution polymerized styrene-butadiene rubber having a glass transition temperature (Tg) ranging from −85° C. to −50° C.;

(C) from 0 to 30 phr of natural rubber or synthetic polyisoprene;

(D) from 0 to 20 phr of a process oil;

(E) from 55 to 80 phr of a resin having an aromatic hydrogen content ranging from 3 to 30 mole percent, the resin having a Tg greater than 30° C.; and (F) from 110 to 160 phr of silica.

16 Claims, No Drawings

(56) References Cited

U.S. PATENT DOCUMENTS

| | | |
|---|---|---|
| 6,372,863 B1 | 4/2002 | Kerns et al. |
| 6,399,697 B1 | 6/2002 | Takasaki et al. |
| 6,410,816 B2 | 6/2002 | Takasaki et al. |
| 6,429,245 B1 | 8/2002 | Francik et al. |
| 6,437,205 B1 | 8/2002 | Miller et al. |
| 6,448,318 B1 | 9/2002 | Sandstrom |
| 6,559,240 B2 | 5/2003 | Hsu et al. |
| 6,573,324 B1 | 6/2003 | Cohen et al. |
| 6,608,125 B2 | 8/2003 | Cruse et al. |
| 6,608,145 B1 | 8/2003 | Lin et al. |
| 6,939,910 B2 | 9/2005 | Nakagawa |
| 7,019,084 B2 | 3/2006 | Sandstrom |
| 7,084,228 B2 | 8/2006 | Labauze et al. |
| 7,214,731 B2 | 5/2007 | Zanzig et al. |
| 7,253,225 B2 | 8/2007 | Labauze et al. |
| 7,259,205 B1 | 8/2007 | Pagliarini et al. |
| 7,335,692 B2 | 2/2008 | Vasseur et al. |
| 7,342,070 B2 | 3/2008 | Tsukimawashi et al. |
| 7,431,061 B2 | 10/2008 | Mathieu et al. |
| 7,897,665 B2 | 3/2011 | Kameda et al. |
| 7,919,553 B2 | 4/2011 | Kawasaki et al. |
| 7,919,571 B2 | 4/2011 | Nakagawa et al. |
| 8,022,136 B2 | 9/2011 | Yano et al. |
| 8,044,118 B2 | 10/2011 | Sakaki et al. |
| 8,053,542 B2 | 11/2011 | Hamann et al. |
| 8,100,157 B2 | 1/2012 | Hattori et al. |
| 8,217,103 B2 | 7/2012 | Thiele et al. |
| 8,324,310 B2 | 12/2012 | Robert et al. |
| 8,362,118 B2 | 1/2013 | Mihara |
| 8,507,582 B2 | 8/2013 | Takizawa |
| 8,569,409 B2 | 10/2013 | Thiele et al. |
| 8,637,606 B2 | 1/2014 | Pille-Wolf et al. |
| 8,669,339 B2 | 3/2014 | Okabe et al. |
| 8,859,650 B2 | 10/2014 | Katou |
| 8,871,832 B2 | 10/2014 | Takizawa |
| 9,062,189 B2 | 6/2015 | Rodgers et al. |
| 9,222,536 B2 | 12/2015 | Nagata |
| 9,441,098 B1 | 9/2016 | Isitman et al. |
| 9,650,503 B2 | 5/2017 | Sandstrom et al. |
| 9,657,161 B2 | 5/2017 | Saintigny et al. |
| 9,757,987 B2 | 9/2017 | Jacoby et al. |
| 9,758,650 B1* | 9/2017 | Isitman ............... C08L 7/00 |
| 9,764,594 B2 | 9/2017 | Isitman et al. |
| 9,771,469 B2 | 9/2017 | Sandstrom et al. |
| 9,846,954 B2 | 12/2017 | Stubblefiled et al. |
| 10,427,463 B2 | 10/2019 | Schweitzer et al. |
| 2001/0002330 A1 | 5/2001 | Benenati et al. |
| 2001/0007049 A1 | 7/2001 | Takasaki et al. |
| 2001/0008083 A1 | 7/2001 | Brown |
| 2001/0023307 A1 | 9/2001 | Kaimai et al. |
| 2002/0000280 A1 | 1/2002 | Scholl |
| 2002/0045697 A1 | 4/2002 | Sohnen et al. |
| 2003/0130535 A1 | 7/2003 | Deschler et al. |
| 2003/0205309 A1 | 11/2003 | Sandstrom |
| 2004/0031548 A1 | 2/2004 | Amaddeo et al. |
| 2004/0069388 A1 | 4/2004 | Blok et al. |
| 2004/0127617 A1 | 7/2004 | Vasseur et al. |
| 2004/0254301 A1 | 12/2004 | Tsukimawashi et al. |
| 2005/0197442 A1 | 9/2005 | Jones et al. |
| 2006/0041063 A1 | 2/2006 | Cruse et al. |
| 2006/0167160 A1 | 7/2006 | Nakagawa et al. |
| 2007/0037908 A1 | 2/2007 | Pille-Wolf |
| 2007/0299197 A1 | 12/2007 | Lin et al. |
| 2008/0066838 A1 | 3/2008 | Zhang et al. |
| 2009/0131572 A1 | 5/2009 | Cambon et al. |
| 2009/0242091 A1 | 10/2009 | Puhala et al. |
| 2010/0099796 A1 | 4/2010 | Lopitaux et al. |
| 2010/0113703 A1 | 5/2010 | Houjo et al. |
| 2010/0160513 A1 | 6/2010 | Sandstrom |
| 2010/0186868 A1 | 7/2010 | Sandstrom et al. |
| 2010/0186869 A1 | 7/2010 | Sandstrom et al. |
| 2010/0204358 A1 | 8/2010 | Lopitaux |
| 2011/0009547 A1 | 1/2011 | Araujo Da Silva et al. |
| 2011/0114240 A1 | 5/2011 | Skurich et al. |
| 2011/0124771 A1 | 5/2011 | Sandstrom et al. |
| 2011/0144236 A1 | 6/2011 | Mihara |
| 2011/0152405 A1 | 6/2011 | Thomasson et al. |
| 2011/0160337 A1 | 6/2011 | Ishino |
| 2011/0184084 A1 | 7/2011 | Katou |
| 2011/0190416 A1 | 8/2011 | Maesaka et al. |
| 2011/0263750 A1 | 10/2011 | Lopitaux et al. |
| 2011/0301261 A1 | 12/2011 | Thiele et al. |
| 2012/0016056 A1 | 1/2012 | Miyazaki |
| 2012/0024441 A1 | 2/2012 | Ryba et al. |
| 2012/0029114 A1 | 2/2012 | Francik et al. |
| 2012/0030102 A1 | 2/2012 | Doehler et al. |
| 2012/0077902 A1 | 3/2012 | Steiner et al. |
| 2012/0123018 A1 | 5/2012 | Kanz et al. |
| 2012/0138203 A1 | 6/2012 | Kaes et al. |
| 2012/0157568 A1 | 6/2012 | Sandstrom et al. |
| 2012/0208919 A1 | 8/2012 | Kanz et al. |
| 2012/0285599 A1 | 11/2012 | Miyazaki |
| 2012/0309902 A1 | 12/2012 | Okabe et al. |
| 2013/0030102 A1 | 1/2013 | Sato |
| 2013/0096248 A1 | 4/2013 | Thompson et al. |
| 2013/0109800 A1 | 5/2013 | Weber |
| 2013/0116376 A1 | 5/2013 | Custodero et al. |
| 2013/0184397 A1* | 7/2013 | Blok .................. C08L 21/00 |
| | | 524/518 |
| 2013/0267640 A1 | 10/2013 | Lopez et al. |
| 2013/0274404 A1 | 10/2013 | Vasseur et al. |
| 2013/0281588 A1 | 10/2013 | Lin et al. |
| 2013/0289183 A1 | 10/2013 | Kerns et al. |
| 2013/0296471 A1 | 11/2013 | Lesage et al. |
| 2013/0310483 A1 | 11/2013 | Botti et al. |
| 2013/0323449 A1 | 12/2013 | Bergmann et al. |
| 2013/0331498 A1 | 12/2013 | Miyazaki |
| 2013/0338256 A1 | 12/2013 | Steiner et al. |
| 2013/0340909 A1 | 12/2013 | Zhao |
| 2014/0024745 A1 | 1/2014 | Vasseur et al. |
| 2014/0041776 A1 | 2/2014 | Reinardt et al. |
| 2014/0041777 A1 | 2/2014 | Djelloul-Mazouz et al. |
| 2014/0090763 A1 | 4/2014 | Sugimoto |
| 2014/0135437 A1 | 5/2014 | Sandstrom et al. |
| 2014/0171557 A1 | 6/2014 | Ringot |
| 2014/0256847 A1 | 9/2014 | Sato et al. |
| 2014/0371346 A1 | 12/2014 | Saintigny et al. |
| 2015/0031791 A1 | 1/2015 | Sugiura |
| 2015/0087745 A1 | 3/2015 | Chekanov et al. |
| 2015/0148448 A1 | 5/2015 | Jung et al. |
| 2015/0283854 A1 | 10/2015 | Saintigny et al. |
| 2015/0315358 A1 | 11/2015 | Yonemoto et al. |
| 2015/0343843 A1 | 12/2015 | Cato et al. |
| 2016/0009904 A1 | 1/2016 | Lin et al. |
| 2016/0159147 A1 | 6/2016 | Isitman et al. |
| 2016/0159157 A1 | 6/2016 | Jacoby et al. |
| 2016/0368324 A1 | 12/2016 | Miyazaki |
| 2016/0376428 A1 | 12/2016 | Sandstrom et al. |
| 2017/0037225 A1 | 2/2017 | Isitman et al. |
| 2017/0051134 A1 | 2/2017 | Yamagishi |
| 2017/0051135 A1 | 2/2017 | Sandstrom et al. |
| 2017/0107360 A1 | 4/2017 | Takahashi |
| 2017/0114212 A1 | 4/2017 | Pompei et al. |
| 2017/0145195 A1 | 5/2017 | Isitman et al. |
| 2017/0166732 A1 | 6/2017 | Isitman et al. |
| 2017/0198122 A1 | 7/2017 | Rodgers et al. |
| 2017/0210885 A1 | 7/2017 | Xue et al. |
| 2017/0232795 A1 | 8/2017 | Isitman et al. |
| 2017/0291450 A1 | 10/2017 | Izumo et al. |
| 2017/0334244 A1 | 11/2017 | Isitman et al. |
| 2017/0349733 A1 | 12/2017 | Isitman et al. |
| 2017/0362415 A1 | 12/2017 | Iizuka |
| 2018/0100058 A1 | 4/2018 | Pavon Sierra et al. |
| 2018/0154696 A1 | 6/2018 | Isitman et al. |
| 2018/0223082 A1 | 8/2018 | Lesage et al. |
| 2018/0223083 A1 | 8/2018 | Lesage et al. |
| 2019/0062529 A1 | 2/2019 | Isitman et al. |
| 2019/0062532 A1 | 2/2019 | Isitman et al. |
| 2019/0062533 A1* | 2/2019 | Isitman ................ B60C 1/00 |
| 2019/0062534 A1 | 2/2019 | Broemmel et al. |
| 2019/0062537 A1 | 2/2019 | Mejia et al. |
| 2019/0176520 A1 | 6/2019 | Takenaka |

(56) References Cited

U.S. PATENT DOCUMENTS

| | | |
|---|---|---|
| 2019/0330452 A1 | 10/2019 | Isitman et al. |
| 2020/0283602 A1 | 9/2020 | Isitman et al. |
| 2020/0317890 A1 | 10/2020 | Hatanaka |

FOREIGN PATENT DOCUMENTS

| | | |
|---|---|---|
| EP | 0839891 B1 | 6/2004 |
| EP | 1990217 B1 | 12/2009 |
| EP | 2289712 A1 | 3/2011 |
| EP | 2412544 A1 | 2/2012 |
| EP | 2433812 A1 | 3/2012 |
| EP | 2460670 A1 | 6/2012 |
| EP | 2468815 A1 | 6/2012 |
| EP | 2655500 A1 | 6/2012 |
| EP | 2270088 B1 | 5/2013 |
| EP | 2455232 B1 | 8/2013 |
| EP | 2733170 A1 | 5/2014 |
| EP | 3031621 A1 | 6/2016 |
| EP | 3103655 A1 | 12/2016 |
| JP | H06116443 | 4/1994 |
| JP | 2002097369 | 4/2002 |
| JP | 4762562 B2 | 6/2011 |
| WO | 2007047943 A2 | 4/2007 |
| WO | 2010033363 A1 | 3/2010 |
| WO | 2012012133 A1 | 1/2012 |
| WO | 2013040425 A1 | 3/2013 |
| WO | 2013147827 | 10/2013 |
| WO | 2015124679 A1 | 8/2015 |
| WO | 2015124681 A1 | 8/2015 |
| WO | 2015124684 A1 | 8/2015 |
| WO | 2016109476 A1 | 7/2016 |

OTHER PUBLICATIONS

Kolon Industries, Product Information, HIKOREZT-1100, Aliphatic hydrocarbon resin, Jan. 1, 2014, Rev. 10, Korea.
Kuttner, Escorez, ExxonMobil Chemical.
Neville Chemical Company, Super NEVTAC 99, Technical Data Sheet, Apr. 8, 2016, Pittsburgh, PA, USA.

* cited by examiner

PNEUMATIC TIRE

BACKGROUND OF THE INVENTION

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads.

Tires are sometimes desired with treads for promoting traction on snowy surfaces. Various rubber compositions may be proposed for tire treads. Here, the challenge is to reduce the cured stiffness of such tread rubber compositions, as indicated by having a lower storage modulus G' at −20° C., when the tread is intended to be used for low temperature winter conditions, particularly for vehicular snow driving.

It is considered that significant challenges are presented for providing such tire tread rubber compositions for maintaining both their wet traction while promoting low temperature (e.g. winter) performance.

SUMMARY OF THE INVENTION

The present invention is directed to a pneumatic tire having a tread comprising a vulcanizable rubber composition comprising, based on 100 parts by weight of elastomer (phr), (A) from about 45 to about 100 phr of a low-cis polybutadiene having a vinyl-1,2 content ranging from 5 to 30 percent and a Tg ranging from −95° C. to −70° C.;

(B) from about 0 to about 40 phr of a solution polymerized styrene-butadiene rubber having a glass transition temperature (Tg) ranging from −85° C. to −50° C.;

(C) from 0 to 30 phr of natural rubber or synthetic polyisoprene;

(D) from 0 to 20 phr of a process oil;

(E) from 55 to 80 phr of a resin having an aromatic hydrogen content ranging from 3 to 30 mole percent, the resin having a Tg greater than 30° C.; and (F) from 110 to 160 phr of silica.

The invention is further directed to a method of making a tire.

DESCRIPTION OF THE INVENTION

There is disclosed a pneumatic tire having a tread comprising a vulcanizable rubber composition comprising, based on 100 parts by weight of elastomer (phr), (A) from about 45 to about 100 phr of a low-cis polybutadiene having a vinyl-1,2 content ranging from 5 to 30 percent and a Tg ranging from −95° C. to −70° C.;

(B) from about 0 to about 40 phr of a solution polymerized styrene-butadiene rubber having a glass transition temperature (Tg) ranging from −85° C. to −50° C.;

(C) from 0 to 30 phr of natural rubber or synthetic polyisoprene;

(D) from 0 to 20 phr of a process oil;

(E) from 55 to 80 phr of a resin having an aromatic hydrogen content ranging from 3 to 30 mole percent, the resin having a Tg greater than 30° C.; and (F) from 110 to 160 phr of silica.

There is further disclosed a method of making a tire.

One component of the rubber composition is from about 45 to about 100 phr, alternatively 55 to 80 phr, of a polybutadiene.

In one embodiment, the polybutadiene is a low cis polybutadiene has a vinyl-1,2 content of from 5 to 30 percent and a Tg in a range of from −95 to −70 C. Such low cis polybutadiene typical consist of each of the cis-1,4/trans-1,4/vinyl-1,2 monomer insertions are no more than 50 percent in the polybutadiene polymer chain, and is produced via anionic solution polymerization with a lithium catalyst. In one embodiment, the low cis polybutadiene includes from 10 to 30 percent vinyl 1,2; from 15 to 45 percent cis-1,4; and the balance trans-1,4 to make up 100 percent of the polymer. In one embodiment, the low cis polybutadiene is SE PB-5800 from Trinseo, with about 11% vinyl-1,2, 39% cis-1,4 and 50% trans-1,4 insertions and a Tg of about −90° C.

In one embodiment, the low cis polybutadiene is a functionalized low cis polybutadiene. Such functionalized low cis polybutadiene may be one or more functional groups appended to the polymer chain at either terminus or in-chain. Functional groups may be incorporated during polymerization as a function initiator or function terminator for terminal appendage, or as a functional monomer for in-chain insertion. Functional groups may include hydroxyl, amino, alkoxy, alkoxyamine, thiol, silane, alkoxysilane, alkoxyaminosilane, and the like. Such functional groups impart the ability of the functionalized low-cis polybutadiene to react with surface active groups such as hydroxyl groups on silica to facilitate dispersion and interaction between the silica and low-cis polybutadiene mixed in a rubber compound.

The rubber composition includes from 0 to 40 phr, alternatively 20 to 40 phr, of a styrene-butadiene rubber having a glass transition temperature (Tg) ranging from −85° C. to −50° C. The styrene-butadiene rubber may be functionalized with various functional groups, or the styrene-butadiene rubber may be non-functionalized. In on embodiment the styrene-butadiene rubber is functionalized with an alkoxysilane group and at least one of a primary amine group and thiol group. In one embodiment, the styrene-butadiene rubber is obtained by copolymerizing styrene and butadiene, and characterized in that the styrene-butadiene rubber has a primary amino group and/or thiol group and an alkoxysilyl group which are bonded to the polymer chain. In one embodiment, the alkoxysilyl group is an ethoxysilyl group. In one embodiment, the styrene-butadiene rubber is not functionalized.

The primary amino group and/or thiol group may be bonded to any of a polymerization initiating terminal, a polymerization terminating terminal, a main chain of the styrene-butadiene rubber and a side chain, as long as it is bonded to the styrene-butadiene rubber chain. However, the primary amino group and/or thiol group is preferably introduced to the polymerization initiating terminal or the polymerization terminating terminal, in that the disappearance of energy at a polymer terminal is inhibited to improve hysteresis loss characteristics.

Further, the content of the alkoxysilyl group bonded to the polymer chain of the (co)polymer rubber is preferably from 0.5 to 200 mmol/kg of styrene-butadiene rubber. The content is more preferably from 1 to 100 mmol/kg of styrene-butadiene rubber, and particularly preferably from 2 to 50 mmol/kg of styrene-butadiene rubber.

The alkoxysilyl group may be bonded to any of the polymerization initiating terminal, the polymerization terminating terminal, the main chain of the (co)polymer and the side chain, as long as it is bonded to the (co)polymer chain. However, the alkoxysilyl group is preferably introduced to the polymerization initiating terminal or the polymerization terminating terminal, in that the disappearance of energy is inhibited from the (co)polymer terminal to be able to improve hysteresis loss characteristics.

The styrene-butadiene rubber can be produced by polymerizing styrene and butadiene in a hydrocarbon solvent by anionic polymerization using an organic alkali metal and/or an organic alkali earth metal as an initiator, adding a terminating agent compound having a primary amino group protected with a protective group and/or a thiol group protected with a protecting group and an alkoxysilyl group to react it with a living polymer chain terminal at the time when the polymerization has substantially completed, and then conducting deblocking, for example, by hydrolysis or other appropriate procedure. In one embodiment, the styrene-butadiene rubber can be produced as disclosed in U.S. Pat. No. 7,342,070. In another embodiment, the styrene-butadiene rubber can be produced as disclosed in WO 2007/047943.

In one embodiment, and as taught in U.S. Pat. No. 7,342,070, the styrene-butadiene rubber is of the formula (I) or (II)

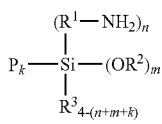

wherein P is a (co)polymer chain of a conjugated diolefin or a conjugated diolefin and an aromatic vinyl compound, $R^1$ is an alkylene group having 1 to 12 carbon atoms, $R^2$ and $R^3$ are each independently an alkyl group having 1 to 20 carbon atoms, an allyl group or an aryl group, n is an integer of 1 or 2, m is an integer of 1 or 2, and k is an integer of 1 or 2, with the proviso that n+m+k is an integer of 3 or 4,

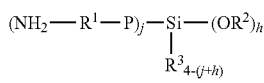

wherein P, $R^1$, $R^2$ and $R^3$ have the same definitions as give for the above-mentioned formula I, j is an integer of 1 to 3, and h is an integer of 1 to 3, with the provision that j+h is an integer of 2 to 4.

The terminating agent compound having a protected primary amino group and an alkoxysilyl group may be any of various compounds as are known in the art. In one embodiment, the compound having a protected primary amino group and an alkoxysilyl group may include, for example, N,N-bis(trimethylsilyl)aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)-aminoethyltriethoxysilne, N,N-bis(trimethylsilyl)aminoethylmethyldimethoxysilane, N,N-bis(trimethylsilyl)aminoethylmethyldiethoxysilane, etc., and preferred are 1-trimethylsilyl-2,2-dimethoxy-1-aza-2-silacyclopentane, N,N-bis(trimethylsilyl) aminopropylmethyldimethoxysilane and N,N-bis(trimethylsilyl)aminopropylmethyldiethoxysilane. In one embodiment, the compound having a protected primary amino group and an alkoxysilyl group is N,N-bis(trimethylsilyl)aminopropyltriethoxysilane.

In one embodiment, the compound having a protected primary amino group and an alkoxysilyl group may be any compound of formula III $$RN—(CH_2)_xSi(OR')_3, \qquad III$$

wherein R in combination with the nitrogen (N) atom is a protected amine group which upon appropriate post-treatment yields a primary amine, R' represents a group having 1 to 18 carbon atoms selected from an alkyl, a cycloalkyl, an allyl, or an aryl; and X is an integer from 1 to 20. In one embodiment, at least one R' group is an ethyl radical. By appropriate post-treatment to yield a primary amine, it is meant that subsequent to reaction of the living polymer with the compound having a protected primary amino group and an alkoxysilyl group, the protecting groups are removed. For example, in the case of bis(trialkylsilyl) protecting group as in N,N-bis(trimethylsilyl)aminopropyltriethoxysilane, hydrolysis is used to remove the trialkylsilyl groups and leave the primary amine.

In one embodiment, the rubber composition includes from about 40 to about 60 phr of styrene-butadiene rubber functionalized with an alkoxysilane group and a primary amine group or thiol group.

Suitable styrene-butadiene rubbers functionalized with an alkoxysilane group and a primary amine group are available commercially, such as HPR 340 from Japan Synthetic Rubber (JSR).

In one embodiment, the solution polymerized styrene-butadiene rubber is as disclosed in WO 2007/047943 and is functionalized with an alkoxysilane group and a thiol, and comprises the reaction product of a living anionic polymer and a silane-sulfide modifier represented by the formula IV $$(R^4O)_xR^4_ySi—R^5—S—SiR^4_3 \qquad IV$$

wherein Si is silicon; S is sulfur; O is oxygen; x is an integer selected from 1, 2 and 3; y is an integer selected from 0, 1, and 2; x+y=3; $R^4$ is the same or different and is $(C_1-C_{16})$ alkyl; and R' is aryl, and alkyl aryl, or $(C_1-C_{16})$ alkyl. In one embodiment, $R^5$ is a $(C_1-C_{16})$ alkyl. In one embodiment, each $R^4$ group is the same or different, and each is independently a $C_1-C_5$ alkyl, and $R^5$ is $C_1-C_5$ alkyl.

The solution polymerized styrene-butadiene rubber has a glass transition temperature in a range from −85° C. to −50° C. A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute, for example according to ASTM D7426 or equivalent.

Suitable styrene-butadiene rubbers functionalized with an alkoxysilane group and a thiol group are available commercially, such as Sprintan SLR 3402 from Trinseo.

Another component of the rubber composition is from about 0 to about 30 phr, alternatively from 10 to 30 phr, of natural rubber or synthetic polyisoprene. In one embodiment, the rubber composition comprises from 15 to 25 phr of natural rubber or synthetic polyisoprene. In one embodiment, the rubber composition comprises from 5 to 15 phr of natural rubber or synthetic polyisoprene.

The rubber composition may include 0 to 20 phr, alternatively 1 to 20 phr, of a processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, and low PCA oils, such as MES, TDAE, and heavy naphthenic oils, vegetable oils such as sunflower, soybean, and safflower oils, and monoesters of fatty acids selected from the group consisting of alkyl oleates, alkyl stearates, alkyl linoleates, and alkyl palmitates.

Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

Suitable TDAE oils are available as Tudalen SX500 from Klaus Dahleke KG, VivaTec 400 and VivaTec 500 from H&R Group, and Enerthene 1849 from BP, and Extensoil 1996 from Repsol.

The oils may be available as the oil alone or along with an elastomer in the form of an extended elastomer.

Suitable vegetable oils include, for example, soybean oil, sunflower oil and canola oil which are in the form of esters containing a certain degree of unsaturation.

The rubber composition further includes from 50 to 80 phr, alternatively 55 to 80 phr, of a resin. In one embodiment, the resin is selected from C5/C9 resins and dicyclopentadiene (DCPD)/C9 resins.

In one embodiment, the resin is a C5/C9 hydrocarbon resin comprising C5 and C9 hydrocarbon fractions, wherein the resin has a glass transition temperature greater than 30° C. A suitable measurement of Tg for resins is DSC according to ASTM D6604 or equivalent. The hydrocarbon resin has a softening point between 0° C. and 160° C. as determined by ASTM E28 which might sometimes be referred to as a ring and ball softening point.

Suitable C5/C9 resins may include both aromatic and nonaromatic components. Differences in the C5/C9 resins are largely due to the olefins in the feedstock from which the hydrocarbon components are derived. The C5/C9 resin may contain "aliphatic" hydrocarbon components which have a hydrocarbon chain formed from C4-C6 fractions containing variable quantities of piperylene, isoprene, mono-olefins, and non-polymerizable paraffinic compounds. Such C5/C9 resins are based on pentene, butane, isoprene, piperylene, and contain reduced quantities of cyclopentadiene or dicyclopentadiene. The C5/C9 resin may also contain "aromatic" hydrocarbon structures having polymeric chains which are formed of aromatic units, such as styrene, xylene, .alpha.-methylstyrene, vinyl toluene, and indene.

In accordance with the present invention, the C5/C9 resin used in rubber compounding includes olefins such as piperylene, isoprene, amylenes, and cyclic components. The C5/C9 resin may also contain aromatic olefins such as styrenic components and indenic components.

Piperylenes are generally a distillate cut or synthetic mixture of C5 diolefins, which include, but are not limited to, cis-1,3-pentadiene, trans-1,3-pentadiene, and mixed 1,3-pentadiene. In general, piperylenes do not include branched C5 diolefins such as isoprene. In one embodiment, the C5/C9 resin has from 40 to 90% (by weight) piperylene, or from 50 to 90%, or more preferably from 60 to 90%. In a particularly preferred embodiment, the C5/C9 resin has from 70 to 90% piperylene.

In one embodiment, the C5/C9 resin is substantially free of isoprene. In another embodiment, the C5/C9 resin contains up to 15% isoprene, or less than 10% isoprene. In yet another embodiment, the C5/C9 resin contains less than 5% isoprene.

In one embodiment, the C5/C9 resin is substantially free of amylene. In another embodiment, the C5/C9 resin contains up to 40% amylene, or less than 30% amylene, or less than 25% amylene. In yet another embodiment, the C5/C9 resin contains up to 10% amylene.

Cyclics are generally a distillate cut or synthetic mixture of C5 and C6 cyclic olefins, diolefins, and dimers therefrom. Cyclics include, but are not limited to, cyclopentene, cyclopentadiene, dicyclopentadiene, cyclohexene, 1,3-cyclohexadiene, and 1,4-cyclohexadiene. A preferred cyclic is cyclopentadiene. The dicyclopentadiene may be in either the endo or exo form. The cyclics may or may not be substituted. Preferred substituted cyclics include cyclopentadienes and dicyclopentadienes substituted with a C1 to C40 linear, branched, or cyclic alkyl group, preferably one or more methyl groups. In one embodiment the C5/C9 resin may include up to 60% cyclics or up to 50% cyclics. Typical lower limits include at least about 0.1% or at least about 0.5% or from about 1.0% cyclics are included. In at least one embodiment, the C5/C9 resin may include up to 20% cyclics or more preferably up to 30% cyclics. In a particularly preferred embodiment, the C5/C9 resin comprises from about 1.0 to about 15% cyclics, or from about 5 to about 15% cyclics.

Preferred aromatics that may be in the C5/C9 resin include one or more of styrene, indene, derivatives of styrene, and derivatives of indene. Particularly preferred aromatic olefins include styrene, alpha-methylstyrene, beta-methylstyrene, indene, and methylindenes, and vinyl toluenes. The aromatic olefins are typically present in the C5/C9 resin from 5 to 45%, or more preferably from 5 to 30%. In particularly preferred embodiments, the C5/C9 resin comprises from 10 to 20% aromatic olefins.

Styrenic components include styrene, derivatives of styrene, and substituted sytrenes. In general, styrenic components do not include fused-rings, such as indenics. In one embodiment, the C5/C9 resin comprises up to 60% styrenic components or up to 50% styrenic components. In one embodiment, the C5/C9 resin comprises from 5 to 30% styrenic components, or from 5 to 20% styrenic components. In a preferred embodiment, the C5/C9 resin comprises from 10 to 15% styrenic components.

The C5/C9 resin may comprise less than 15% indenic components, or less than 10% indenic components. Indenic components include indene and derivatives of indene. In one embodiment, the C5/C9 resin comprises less than 5% indenic components. In another embodiment, the C5/C9 resin is substantially free of indenic components.

Preferred C5/C9 resins have melt viscosity of from 300 to 800 centipoise (cPs) at 160 C, or more preferably of from 350 to 650 cPs at 160 C. In a particularly preferred embodiment, the C5/C9 resin's melt viscosity is from 375 to 615 cPs at 160 C., or from 475 to 600 cPs at 160 C. The melt viscosity may be measured by a Brookfield viscometer with a type "J" spindle, ASTM D6267.

Generally C5/C9 resins have a weight average molecular weight (Mw) greater than about 600 g/mole or greater than about 1000 g/mole. In at least one embodiment, C5/C9 resins have a weight average molecular weight (Mw) of from 1650 to 1950 g/mole, or from 1700 to 1900 g/mole. Preferably C5/C9 resins have a weight average molecular weight of from 1725 to 1890 g/mole. The C5/C9 resin may have a number average molecular weight (Mn) of from 450 to 700 g/mole, or from 500 to 675 g/mole, or more preferably from 520 to 650 g/mole. The C5/C9 resin may have a z-average molecular weight (Mz) of from 5850 to 8150 g/mole, or more preferably from 6000 to 8000 g/mole. Mw, Mn, and Mz may be determined by gel permeation chromatography (GPC).

In one embodiment the C5/C9 resin has a polydispersion index ("PDI", PDI=Mw/Mn) of 4 or less. In a particularly preferred embodiment the C5/C9 resin has a PDI of from 2.6 to 3.1.

Preferred C5/C9 resins have a glass transition temperature (Tg) of from about −30 C to about 100 C, or from about 0 C. to 80 C, or from about 40-60 C, or from 45-55 C, or more preferably of from 48-53.degree. C. Differential scanning calorimetry (DSC) may be used to determine the C5/C9 resin's Tg.

In another embodiment the C5/C9 resin may be hydrogenated.

In one embodiment, the C5/C9 resin comprises 50-90% (by weight) piperylene, 0-5% isoprene, 10-30% amylenes, 0-5% cyclics, 0-10% styrenics, and 0-10% indenics.

In one embodiment, the C5/C9 resin comprises 50-90% (by weight) piperylene, 0-5% isoprene, 10-30% amylenes, 2-5% cyclics, 4-10% styrenics, and 4-10% indenics.

In one embodiment, the C5/C9 comprises about 60% (by weight) piperylene, about 22% amylene, about 3% cyclics, about 6% styrene, and about 6% indene, and further has a melt viscosity at 160 C of 436 cPs; Mn of 855 g/mole; Mw of 1595 g/mole; Mz of 3713 g/mole; PDI of 1.9; and Tg of 47 C.

The resin, including but not limited to C5/C9 resin or DCPD/C9 resin, may further be characterized by its aromatic hydrogen content, as determined by 1H NMR. In one embodiment, the resin has an aromatic hydrogen content ranging from 3 to 30 mole percent. In one embodiment, the resin has an aromatic hydrogen content less than 25 mole percent. In one embodiment, the resin has an aromatic hydrogen content is between 3 and 15 mole percent.

An example of a useful resin is the Oppera series of polymeric additives commercially available from ExxonMobil Chemical Company, including but not limited to Oppera 373.

In one embodiment, the resin is a DCPD/C9 resin. A suitable DCPD/C9 resin is a hydrogenated DCPD/C9 resin available as Oppera 383 having an aromatic hydrogen content of about 10 mole percent.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials, and such terms are well known to those having skill in the rubber mixing or rubber compounding art.

The vulcanizable rubber composition may include from about 1100 to about 160 phr of silica.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, 315 etc.; silicas available from Rhodia, with, for example, designations of Z1165MP and Z165GR and silicas available from Degussa AG with, for example, designations VN2 and VN3, etc.

Pre-hydrophobated precipitated silica may be used. By pre-hydrophobated, it is meant that the silica is pretreated, i.e., the pre-hydrophobated precipitated silica is hydrophobated prior to its addition to the rubber composition by treatment with at least one silane. Suitable silanes include but are not limited to alkylsilanes, alkoxysilanes, organoalkoxysilyl polysulfides and organomercaptoalkoxysilanes. Alternatively, the precipitated silica may be pre-treated with a silica coupling agent comprised of, for example, an alkoxyorganomercaptosilane or combination of alkoxysilane and alkoxyorganomercaptosilane prior to blending the pre-treated silica with the rubber instead of reacting the precipitated silica with the silica coupling agent in situ within the rubber. For example, see U.S. Pat. No. 7,214,731. For various pre-treated precipitated silicas see, for example, U.S. Pat. Nos. 4,704,414, 6,123,762 and 6,573,324. Suitable pre-treated or pre-hydrophobated silica is available commercially for example as Agilon 400 from PPG.

The vulcanizable rubber composition may include from about 1 to about 20 phr of carbon black.

Commonly employed carbon blacks can be used as a conventional filler. Representative examples of such carbon blacks include N110, N121, N134, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

It may be preferred to have the rubber composition for use in the tire component to additionally contain a conventional sulfur containing organosilicon compound. Examples of suitable sulfur containing organosilicon compounds are of the formula:

$$Z\text{-Alk-}S_n\text{-Alk-}Z \quad\quad\quad V$$

in which Z is selected from the group consisting of

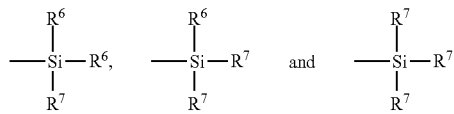

where $R^6$ is an alkyl group of 1 to 4 carbon atoms, cyclohexyl or phenyl; $R^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl) disulfide, 3,3'-bis (triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2''-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis (tricyclopentoxysilylpropyl) trisulfide, 2,2'-bis(tri-2''-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis (methyl ethoxypropoxysilylethyl) tetrasulfide, 3,3'-bis (diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis (dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis(triethoxysilyl-propyl) disulfide and 3,3'-bis(triethoxysilylpropyl) tetrasulfide. Therefore, as to formula V, preferably Z is

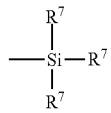

where $R^7$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(\!\!=\!\!O)$ —S—$CH_2CH_2CH_2Si(OCH_2CH_3)_3$, which is available commercially as NXT™ from Momentive Performance Materials.

In one embodiment, the sulfur containing organosilicon compounds include the reaction product of hydrocarbon based diol (e.g., 2-methyl-1,3-propanediol) with S-[3-(triethoxysilyl)propyl] thiooctanoate. In one embodiment, the sulfur containing organosilicon compound is NXT-Z™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound of formula I in a rubber composition will vary depending on the level of other additives that are used. Generally speaking, the amount of the compound of formula I will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1 to 6 phr being preferred. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 5 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 2.0, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a tread of a tire.

The pneumatic tire of the present invention may be a race tire, passenger tire, aircraft tire, agricultural, earthmover, off-the-road, truck tire, and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. All parts are parts by weight unless specifically identified otherwise.

Example 1

This example illustrates the advantage of a rubber composition according to the invention. Rubber compounds were mixed according to the formulations shown in Table 1 and 3, with amounts given in phr. The compounds were cured and tested for physical properties as shown in Tables 2 and 4.

Tables 1-4 contain compound formulations utilizing a high loading level of polybutadiene with a high loading level of traction resin of high and low aromatic hydrogen contents. The inventive examples E1-4 containing a low aromatic hydrogen C5/C9 resin have superior properties compared to comparative examples C1-4 containing a high aromatic hydrogen traction resin in that they demonstrate a lower low temperature stiffness (characterized by lower G' at 1.5% strain, −20° C.) indicative of better tire snow traction, lower room temperature hysteresis (characterized by higher Rebound at 23° C.) indicative of lower tire rolling resistance and equivalent low temperature hysteresis (characterized by similar Rebound at 0° C.) indicative of equivalent tire wet traction.

TABLE 1

| Composition | C1 | E1 |
| --- | --- | --- |
| Styrene-butadiene [1] | 40 | 45 |
| Polybutadiene [2] | 60 | 55 |
| Softener [3] | 10 | 10 |
| Antioxidant(s) | 5.5 | 5.5 |
| Stearic acid | 5 | 5 |
| Silane [4] | 8.8 | 8.8 |
| Silica [5] | 140 | 140 |
| Traction Resin A [6] | 65 | 0 |
| Traction Resin B [7] | 0 | 65 |
| ZnO | 2.5 | 2.5 |
| Sulfur | 1.2 | 1.2 |
| Accelerator | 6.0 | 6.0 |

[1] Solution polymerized SBR with styrene content of 15% and 1,2-vinyl content of 30%, Tg = −60° C. obtained from Trinseo as SLR3402.
[2] High cis polybutadiene, obtained as Budene 1223 from The Goodyear Tire & Rubber Company.
[3] Sunflower oil obtained from Cargill as Agripure oil.
[4] TESPD type silane coupling agent.
[5] Hi-Sil 315G-D precipitated silica from PPG with a CTAB surface area of 125 $m^2/g$
[6] Copolymer of styrene and alpha-methylstyrene, Tg = +39° C., with an aromatic hydrogen content of about 53 mole % obtained as Sylvatraxx4401 from Arizona Chemical.
[7] Petroleum traction resin made of C5 and C9 monomers, Tg = +46° C., with an aromatic hydrogen content of about 4 mole %, obtained as Wingtack ET from Total Cray Valley.

TABLE 2

| Composition | C1 | E1 |
| --- | --- | --- |
| Styrene-butadiene | 40 | 45 |
| Polybutadiene | 60 | 55 |
| Softener | 10 | 10 |
| Traction Resin (A) | 65 | 0 |
| Traction Resin (B) | 0 | 65 |
| Dynamic properties[1] | | |
| G' at 1% strain (MPa) | 2.8 | 2.4 |
| Wet grip property[2] | | |
| Rebound at 0° C. (%) | 12.5 | 12.4 |

TABLE 2-continued

| Composition | C1 | E1 |
|---|---|---|
| Low temperature property[3] | | |
| G' at 1.5% strain, −20° C. (MPa) | 17.7 | 14.9 |
| RR Property[2] | | |
| Rebound at 23° C. (%) | 23.6 | 25.8 |

[1] Data according to Rubber Process Analyzer as RPA 2000 instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, April 26 and May 10, 1993.
[2] Rebound is a measure of hysteresis of the compound when subject to loading, as measured by ASTM D1054. Generally, the lower the measured rebound at 0° C., the better the wet grip property. Generally, the higher the measured rebound at 23° C., the lower the rolling resistance.
[3] The G' modulus at low temperatures can be readily be determined by a Metravib TM instrument at 1.5 percent strain and 7.8 Hertz. The test method is understood to be similar to ISO 4664 and DIN 53513.

TABLE 3

| Composition | E2 | E3 | E4 | C2 | C3 | C4 |
|---|---|---|---|---|---|---|
| Styrene-butadiene [1] | 30 | 30 | 30 | 30 | 30 | 30 |
| Polybutadiene, low cis [2] | 70 | 70 | 70 | 70 | 70 | 70 |
| Softener [3] | 30 | 15 | | 30 | 15 | |
| Antioxidant(s) | 5 | 5 | 5 | 5 | 5 | 5 |
| Stearic acid | 5 | 5 | 5 | 5 | 5 | 5 |
| Silane [4] | 8.8 | 8.8 | 8.8 | 8.8 | 8.8 | 8.8 |
| Silica [5] | 140 | 140 | 140 | 140 | 140 | 140 |
| Traction Resin C [6] | 50 | 65 | 80 | | | |
| Traction Resin A [7] | | | | 50 | 65 | 80 |
| ZnO | 2.5 | 2.5 | 2.5 | 2.5 | 2.5 | 2.5 |
| Sulfur | 1.2 | 1.2 | 1.2 | 1.2 | 1.2 | 1.2 |
| Accelerator | 6.0 | 6.0 | 6.0 | 6.0 | 6.0 | 6.0 |

[1] Solution polymerized SBR with styrene content of 15% and 1,2-vinyl content of 30%, Tg = −60° C. obtained from Trinseo as SLR3402.
[2] Solution polymerized low-cis PBD with 1,2-vinyl content of around 11%, Tg −90° C., and a Mooney viscosity of around 49 obtained from Trinseo as SE PB-5800.
[3] Treated distillate aromatic extracts (TDAE) oil.
[4] TESPD type silane coupling agent.
[5] Hi-Sil 315G-D precipitated silica from PPG with a CTAB surface area of 125 m²/g
[6] Petroleum traction resin made of C5 and C9 monomers, Tg = +38° C., with an aromatic hydrogen content of around 12 mole %, obtained as Oppera PR373 from ExxonMobil.
[7] Copolymer of styrene and alpha-methylstyrene, Tg = +39° C., with an aromatic hydrogen content of about 53 mole % obtained as Sylvatraxx4401 from Arizona Chemical.

TABLE 4

| Composition | E2 | E3 | E4 | C2 | C3 | C4 |
|---|---|---|---|---|---|---|
| Styrene-butadiene | 30 | 30 | 30 | 30 | 30 | 30 |
| Polybutadiene | 70 | 70 | 70 | 70 | 70 | 70 |
| Softener | 30 | 15 | 0 | 30 | 15 | 0 |
| Traction Resin (C) | 50 | 65 | 80 | 0 | 0 | 0 |
| Traction Resin (A) | 0 | 0 | 0 | 50 | 65 | 80 |
| Dynamic properties[1] | | | | | | |
| G' at 1% strain (MPa) | 1.8 | 1.5 | 1.7 | 2.3 | 2.3 | 2.5 |
| Wet grip property[2] | | | | | | |
| Rebound at 0° C. (%) | 15.2 | 11.5 | 7.7 | 12.8 | 10.1 | 9.1 |
| Low temperature property[3] | | | | | | |
| G' at 1.5% strain, −20° C. (MPa) | 12.4 | 12.3 | 21.7 | 20.0 | 30.4 | 47.9 |
| RR Property[2] | | | | | | |
| Rebound at 23° C. (%) | 30.6 | 29.6 | 22.1 | 23.8 | 19.5 | 15.3 |

Example 2

In this example, a rubber composition featuring a blend of fully functionalized low Tg polymers, high Tg plasticizers and high silica loading is illustrated in inventive example E6 as shown in Tables 5 and 6. Such composition is showing better rolling resistance performance referring to rebound value at 23° C., better snow performances referring to storage modulus (G') value at −30° C., better wet performances referring to rebound −10° C., maintained mileage referring to Din Abrasion data (relative volume loss) as compared to C5 and E5.

TABLE 5

| Composition | C5 | E5 | E6 |
|---|---|---|---|
| Styrene-Butadiene, functionalized [1] | 40 | 40 | 40 |
| Polybutadiene, high cis [2] | 60 | 0 | 0 |
| Polybutadiene, low cis [3] | 0 | 60 | 0 |
| Polybutadiene, low cis, functionalized [4] | 0 | 0 | 60 |
| Silica | 140 | 140 | 140 |
| Coupling agent | 8.8 | 8.8 | 8.8 |
| Oil | 5 | 5 | 5 |
| Resin [5] | 62 | 62 | 62 |

[1] Solution polymerized SBR with styrene content of 15% and 1,2-vinyl content of 30%, Tg = −60° C. obtained from Trinseo as SLR3402.
[2] High cis polybutadiene, obtained as Budene 1223 from The Goodyear Tire & Rubber Company.
[3] Low vinyl (11% vinyl), low cis polybutadiene, Tg about −90° C., and a Mooney viscosity of around 49 obtained from Trinseo as SE PB-5800.
[4] Functionalized low vinyl (12% vinyl) low cis polybutadiene, Tg about −92 C. and functional groups reactive with hydroxyl groups on precipitated silica, obtained from Zeon as BR1261.
[5] Petroleum traction resin made of C5 and C9 monomers, Tg = +38° C., with an aromatic hydrogen content of around 12 mole %, obtained as Oppera PR373 from ExxonMobil.

TABLE 6

| RR Property | | | |
|---|---|---|---|
| Rebound 23° C. (higher is better) | 27.0 | 26.8 | 32.2 |
| Low temperature Property | | | |
| G' −30° C. (lower is better) MPa | 33.9 | 29.3 | 23.1 |
| Wet Grip Property | | | |
| Rebound −10° C. (lower is better) | 9.8 | 8.4 | 7.3 |
| Treadwear Property | | | |
| Din Abrasion (Relative volume loss, mm3) (lower is better) | 92 | 148 | 102 |

TABLE 7

| Composition | Cx | Ex |
|---|---|---|
| Styrene-Butadiene, functionalized [1] | 40 | 0 |
| Polybutadiene, high cis [2] | 60 | 0 |
| Polybutadiene, low cis, functionalized [3] | 0 | 100 |
| Silica | 140 | 150 |
| Coupling agent | 8.8 | 9.4 |
| Oil | 5 | 4 |
| Traction Resin (C) [4] | 62 | 0 |
| Traction Resin (B) [5] | 0 | 66 |

[1] Solution polymerized SBR with styrene content of 15% and 1,2-vinyl content of 30%, Tg = −60° C. obtained from Trinseo as SLR3402.
[2] High cis polybutadiene, obtained as Budene 1223 from The Goodyear Tire & Rubber Company.
[3] Functionalized low vinyl (12% vinyl) low cis polybutadiene, Tg about −92 C. and functional groups reactive with hydroxyl groups on precipitated silica, obtained from Kumho Petrochemical as KBR820.
[4] Petroleum traction resin made of C5 and C9 monomers, Tg = +41° C., with an aromatic hydrogen content of around 12 mole %, obtained as Oppera PR373 from ExxonMobil.
[5] Petroleum traction resin made of DCPD/C9, Tg = +56° C., with an aromatic hydrogen content of about 10 mole %, obtained as Oppera PR383 from ExxonMobil.

TABLE 8

| RR Property | | |
|---|---|---|
| Rebound 23° C. (higher is better) | 27 | 35 |
| Low temperature Property | | |
| G' −20° C. (lower is better) MPa | 19 | 12 |

TABLE 8-continued

| Wet Grip Property | | |
|---|---|---|
| Rebound −10° C. (lower is better) | 10 | 10 |
| Treadwear Property | | |
| Din Abrasion (Relative volume loss, mm3) (lower is better) | 107 | 91 |

TABLE 9

| Composition | Cx | Ex | Ex |
|---|---|---|---|
| Styrene-Butadiene, functionalized [1] | 40 | 0 | 15 |
| Polybutadiene, high cis [2] | 60 | 0 | 0 |
| Polybutadiene, low cis, functionalized [3] | 0 | 100 | 70 |
| Natural rubber [4] | 0 | 0 | 15 |
| Silica | 140 | 140 | 140 |
| Coupling agent | 8.8 | 8.8 | 8.8 |
| Oil | 5 | 5 | 5 |
| Traction Resin (C) [5] | 62 | 62 | 62 |

[1] Solution polymerized SBR with styrene content of 15% and 1,2-vinyl content of 30%, Tg = −60° C. obtained from Trinseo as SLR3402.
[2] High cis polybutadiene, obtained as Budene 1223 from The Goodyear Tire & Rubber Company.
[3] Functionalized low vinyl (12% vinyl) low cis polybutadiene, Tg about −92 C. and functional groups reactive with hydroxyl groups on precipitated silica, obtained from Kumho Petrochemical as KBR820.
[4] Natural rubber, Tg about −60° C.
[5] Petroleum traction resin made of C5 and C9 monomers, Tg = +41° C., with an aromatic hydrogen content of around 12 mole %, obtained as Oppera PR373 from ExxonMobil.

TABLE 10

| RR Property | | | |
|---|---|---|---|
| Rebound 23° C. (higher is better) | 28 | 38 | 34 |
| Low temperature Property | | | |
| G' −20° C. (lower is better) MPa | 17 | 8 | 11 |
| Wet Grip Property | | | |
| Rebound −10° C. (lower is better) | 10 | 12 | 9 |
| Treadwear Property | | | |
| Din Abrasion (Relative volume loss, mm3) (lower is better) | 109 | 107 | 121 |

While certain representative embodiments and details have been shown for the purpose of illustrating the subject invention, it will be apparent to those skilled in this art that various changes and modifications can be made therein without departing from the scope of the subject invention.

The invention claimed is:

1. A pneumatic tire having a tread comprising a vulcanizable rubber composition comprising, based on 100 parts by weight of elastomer (phr), (A) from about 45 to about 100 phr of a functionalized low-cis polybutadiene having a vinyl-1,2 content ranging from 5 to 30 percent and a Tg ranging from −95 ° C. to −70 ° C.;
   (B) from about 0 to about 40 phr of a solution polymerized styrene-butadiene rubber having a glass transition temperature (Tg) ranging from −85 ° C. to −50 ° C.;
   (C) from 0 to 30 phr of natural rubber or synthetic polyisoprene;
   (D) from 0 to 20 phr of a process oil;
   (E) from 55 to 80 phr of a resin having an aromatic hydrogen content ranging from 3 to 30 mole percent, the resin having a Tg greater than 30 ° C.; and
   (F) from 110 to 160 phr of silica.

2. The pneumatic tire of claim 1, wherein the low-cis polybutadiene comprises from 10 to 30 percent vinyl-1,2 content and from 15 to 45 percent cis-1,4 content.

3. The pneumatic tire of claim 1, wherein the low-cis polybutadiene is a functionalized low-cis polybutadiene functionalized with a least one member of the group consisting of hydroxyl, amino, alkoxy, alkoxyamine, thiol, silane, alkoxysilane, and alkoxyaminosilane.

4. The pneumatic tire of claim 1, wherein the resin is a C5/C9 resin comprising 50-90% (by weight) piperylenes, 0-5% isoprene, 10-30% amylenes, 0-5% cyclics, 0-10% styrenics, and 0-10% indenics.

5. The pneumatic tire of claim 1, wherein the resin is a C5/C9 resin comprising 50-90% (by weight) piperylenes, 0-5% isoprene, 10-30% amylenes, 2-5% cyclics, 4-10% styrenics, and 4-10% indenics.

6. The pneumatic tire of claim 1, wherein the resin has an aromatic hydrogen content less than 25 mole percent.

7. The pneumatic tire of claim 1, wherein the resin has an aromatic hydrogen content between 3 and 15 mole percent.

8. The pneumatic tire of claim 1, wherein the solution polymerized styrene- butadiene rubber is functionalized with an alkoxysilane group and at least one functional group selected from the group consisting of primary amines and thiols.

9. The pneumatic tire of claim 1, wherein the oil is selected from the group consisting of aromatic, paraffinic, naphthenic, MES, TDAE, heavy naphthenic oils, and vegetable oils.

10. The pneumatic tire of claim 1, wherein the solution polymerized styrene-butadiene rubber functionalized with an alkoxysilane group and a primary amine group, and is represented by the formula (1) or (2)

(1)

wherein P is a (co)polymer chain of a conjugated diolefin or a conjugated diolefin and an aromatic vinyl compound, $R^1$ is an alkylene group having 1 to 12 carbon atoms, $R^2$ and $R^3$ are each independently an alkyl group having 1 to 20 carbon atoms, an allyl group or an aryl group, n is an integer of 1 or 2, m is an integer of 1 or 2, and k is an integer of 1 or 2, with the proviso that n+m+k is an integer of 3 or 4,

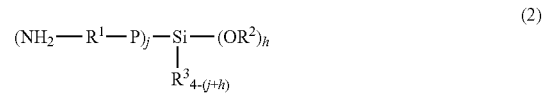

(2)

wherein P, $R^1$, $R^2$ and $R^3$ have the same definitions as give for the above-mentioned formula (1), j is an integer of 1 to 3, and h is an integer of 1 to 3, with the provision that j+h is an integer of 2 to 4.

11. The pneumatic tire of claim 1, wherein the solution polymerized styrene- butadiene rubber is functionalized with an alkoxysilane group and a primary amine group comprises the reaction product of a living polymer chain and a terminating agent of the formula

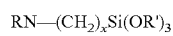

wherein R in combination with the nitrogen (N) atom is a protected amine group which upon appropriate post-treatment yields a primary amine, R' represents a group having 1 to 18 carbon atoms selected from an alkyl, a cycloalkyl, an allyl, or an aryl; and X is an integer from 1 to 20.

12. The pneumatic tire of claim 1 wherein the solution polymerized styrene-butadiene rubber is functionalized with an alkoxysilane group and a thiol, and comprises the reaction product of a living anionic polymer and a silane-sulfide modifier represented by the formula

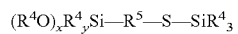

$(R^4O)_x R^4_y Si-R^5-S-SiR^4_3$ wherein Si is silicon; S is sulfur; O is oxygen; x is an integer selected from 1, 2 and 3; y is an integer selected from 0, 1, and 2; x+y=3; $R^4$ is the same or different and is $(C_1-C_{16})$ alkyl; and $R^5$ is aryl, and alkyl aryl, or $(C_1-C_{16})$ alkyl.

13. The pneumatic tire of claim 1, wherein the amount of the styrene-butadiene rubber ranges from 20 to 40 phr.

14. The pneumatic tire of claim 1, wherein the amount of the low cis polybutadiene ranges from 55 to 80 phr.

15. The pneumatic tire of claim 1, wherein the amount of the oil ranges from 1 to 20 phr.

16. The pneumatic tire of claim 1, wherein the amount of the resin ranges from 55 to 80 phr.

* * * * *